US011897034B2

(12) United States Patent
Kim et al.

(10) Patent No.: US 11,897,034 B2
(45) Date of Patent: Feb. 13, 2024

(54) METHOD FOR MANUFACTURING RARE EARTH PERMANENT MAGNET

(71) Applicant: STAR GROUP IND. CO., LTD, Daegu (KR)

(72) Inventors: Dong Hwan Kim, Daegu (KR); Koon Seung Kong, Daegu (KR)

( * ) Notice: Subject to any disclaimer, the term of this patent is extended or adjusted under 35 U.S.C. 154(b) by 796 days.

(21) Appl. No.: 16/975,838

(22) PCT Filed: Sep. 13, 2018

(86) PCT No.: PCT/KR2018/010756

§ 371 (c)(1),
(2) Date: Aug. 26, 2020

(87) PCT Pub. No.: WO2019/212102

PCT Pub. Date: Nov. 7, 2019

(65) Prior Publication Data

US 2020/0406361 A1 Dec. 31, 2020

(30) Foreign Application Priority Data

Apr. 30, 2018 (KR) ........................ 10-2018-0050002

(51) Int. Cl.

| | |
|---|---|
| ***B22F 3/16*** | (2006.01) |
| ***B22F 3/24*** | (2006.01) |
| ***B22F 9/04*** | (2006.01) |
| ***C22C 28/00*** | (2006.01) |
| ***H01F 1/057*** | (2006.01) |
| ***H01F 41/02*** | (2006.01) |

(52) U.S. Cl.

CPC .................. *B22F 3/16* (2013.01); *B22F 3/24* (2013.01); *B22F 9/04* (2013.01); *C22C 28/00* (2013.01);

(Continued)

(58) Field of Classification Search

CPC ...... B22F 3/16; B22F 3/24; B22F 9/04; B22F 2003/248; B22F 2009/044; B22F 2202/05;

(Continued)

(56) References Cited

U.S. PATENT DOCUMENTS

2009/0032147 A1 * 2/2009 Nozawa ................ H01F 1/0577 419/23

FOREIGN PATENT DOCUMENTS

JP 3452254 B2 9/2003
KR 10-1036968 B1 5/2011

(Continued)

OTHER PUBLICATIONS

KR-20170135131-A Translation (Year: 2017).*

(Continued)

*Primary Examiner* — Brian D Walck
*Assistant Examiner* — Danielle Carda
(74) *Attorney, Agent, or Firm* — NKL LAW; Jae Youn Kim

(57) ABSTRACT

There is provided a method for manufacturing a rare earth sintered magnet by many times repetitively finely pulverizing a rare earth alloy on a jet mill by supplying high-pressure nitrogen gas to narrow grain size distribution to make an easy alignment in a magnetic field, and by micronizing crystal grains by using a hydrogenation-disproportionation-desorption-recombination (HDDR) process, to improve the coercivity and thermostability of the rare earth sintered magnet.

1 Claim, 1 Drawing Sheet

(52) U.S. Cl.
CPC ....... *H01F 1/0571* (2013.01); *H01F 41/0266* (2013.01); *B22F 2003/248* (2013.01); *B22F 2009/044* (2013.01); *B22F 2202/05* (2013.01); *B22F 2301/45* (2013.01); *C22C 2202/02* (2013.01)

(58) Field of Classification Search
CPC ............................ B22F 2301/45; B22F 3/101; B22F 2009/048; B22F 2998/10; B22F 9/023; B22F 2999/00; B22F 3/12; C22C 28/00; C22C 2202/02; H01F 1/0571; H01F 41/0266; H01F 1/0573; H01F 1/0575
USPC ............................................................ 419/23
See application file for complete search history.

(56) References Cited

FOREIGN PATENT DOCUMENTS

| | | | | | |
|---|---|---|---|---|---|
| KR | 10-1303717 | B1 | | 9/2013 | |
| KR | 10-1632562 | B1 | | 6/2016 | |
| KR | 10-2017-0045184 | A | | 4/2017 | |
| KR | 10-2017-0135131 | A | | 12/2017 | |
| KR | 20170135131 | A | * | 12/2017 | ......... H01F 41/0293 |
| WO | WO-2017159576 | A1 | * | 9/2017 | ................ B22F 1/00 |

OTHER PUBLICATIONS

WO-2017159576-A1 Translation (Year: 2017).*

Nozawa et al., "Coercivity enhancement of HDDR-processed Nd—Fe—B permanent magnet with the rapid hot-press consolidation process", Journal of Magnetism and Magnetic Materials, 2011, pp. 115-121, vol. 323.

Sepehri-Amin et al., "Coercivity enhancement of hydrogenation-disproportionation-desorption-recombination processed Nd—Fe—B powders by the diffusion of Nd—Cu eutectic alloys", Scripta Materialia, 2010, pp. 1124-1127, vol. 63.

Michihide Nakamura et al., "Preparation of ultrafine jet-milled powders for Nd—Fe—B sintered magnets using hydrogenation-disproportionation-desorption-recombination and hydrogen decrepitation processes", Applied Physics Letters, 2013, 103,022404.

* cited by examiner

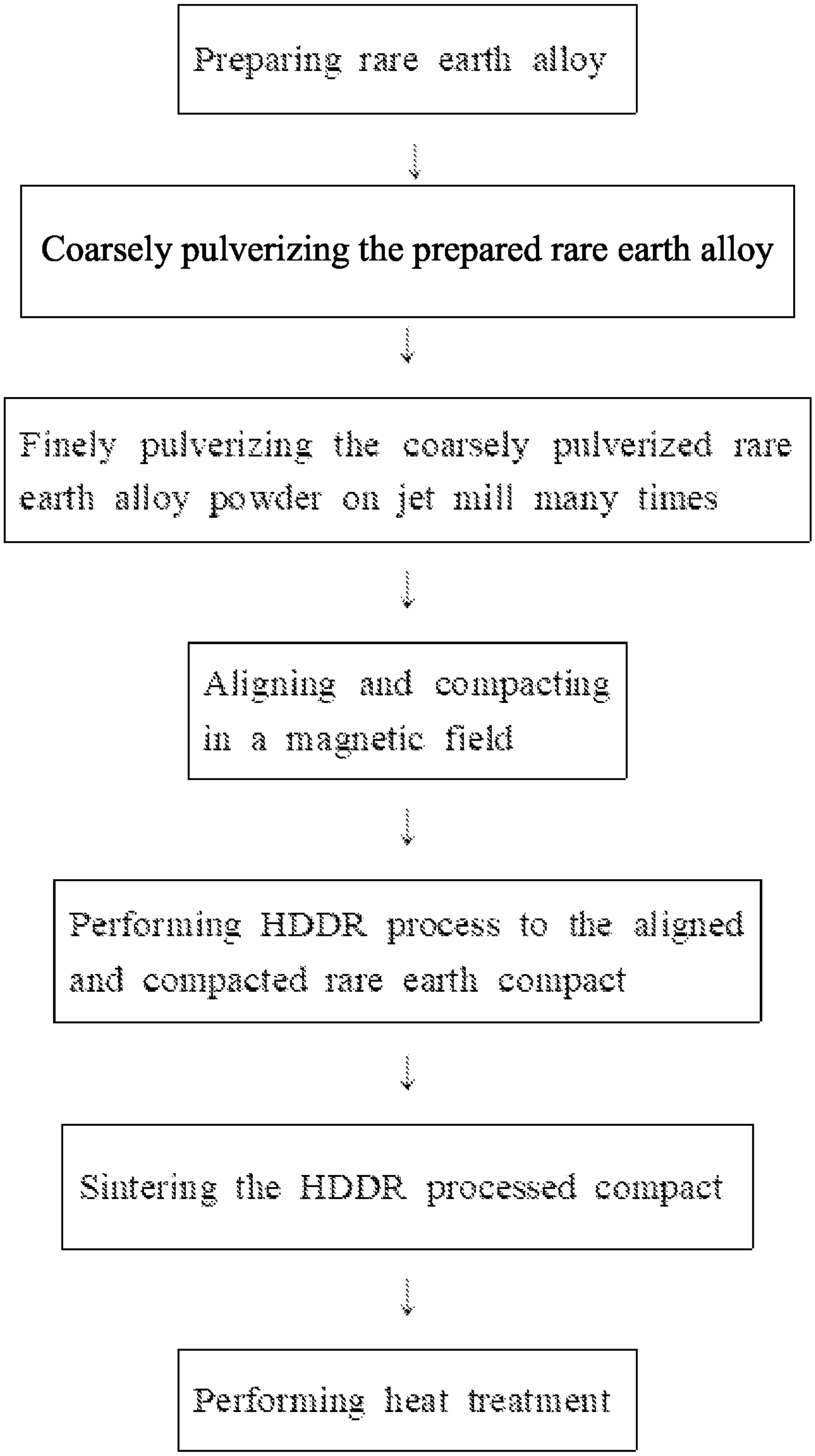
Preparing rare earth alloy
Coarsely pulverizing the prepared rare earth alloy
Finely pulverizing the coarsely pulverized rare earth alloy powder on jet mill many times
Aligning and compacting in a magnetic field
Performing HDDR process to the aligned and compacted rare earth compact
Sintering the HDDR processed compact
Performing heat treatment

METHOD FOR MANUFACTURING RARE EARTH PERMANENT MAGNET

TECHNICAL FIELD

The present invention relates to a method for manufacturing a rare earth sintered magnet, and more particularly, to a method for manufacturing a rare earth sintered magnet by many times repetitively finely pulverizing a rare earth alloy on a jet mill while supplying high-pressure nitrogen gas to narrow grain size distribution to make an easy alignment in a magnetic field, and by micronizing crystal grains by using a hydrogenation-disproportionation-desorption-recombination (HDDR) process, to improve the coercivity and thermostability of the rare earth sintered magnet.

BACKGROUND ART

As the energy saving and eco-friendly green growth projects have been suddenly raised as new issues, research has actively been progressing with respect to a hybrid vehicle which uses in parallel an internal combustion engine using fossil fuel and a motor or a fuel cell vehicle which generates electricity to drive a motor by using hydrogen as an eco-friendly energy source.

Since eco-friendly vehicles are driven by using electric energy, a permanent magnetic motor and generator are inevitably required. In terms of magnetic materials, the technical demand on a rare earth sintered magnet having more excellent hard magnetic performance has increased to further improve the energy efficiency.

Further, in other terms of fuel-efficiency of a vehicle, a vehicle component needs to be light in weight and small in size. For example, to realize a light and small motor, it is necessary to change the design of a motor and to replace the permanent magnet material with a rare earth permanent magnet which has excellent magnetic performance than ferrite as previously used.

Theoretically, the residual magnetic flux density of a permanent magnet is determined by the conditions: the saturated magnetic flux density of the main phase forming a material, the anisotropic level of crystal grains and the density of the magnet. Since the magnet generates a stronger magnetism to the outside as the residual magnetic flux density increases, the efficiency and performance of equipment are improved in many application fields.

Further, among the magnetic properties of a permanent magnet, coercivity has the function to maintain the intrinsic performance of the permanent magnet against the environments to demagnetize the magnet, such as, the opposite directional magnetic field, mechanical impacts, etc. Therefore, if the coercivity is excellent, since environment resistance is good, the magnet with excellent coercivity is usable for high-temperature instruments, large output instruments, etc. Further, since such a magnet can be made thinly, the weight of the magnet is reduced to increase an economic value.

An R—Fe—B based rare earth magnet is known as the material of the permanent magnet having the aforementioned excellent magnetic performance.

However, since a rare earth magnet uses an expensive rare earth element as a main material, the costs for manufacturing a rare earth magnet are higher than the costs for manufacturing a ferrite magnet. Thus, when a rare earth magnet is used, the price of a motor is up. Further, since the deposits of rare earth elements are not abundant compared to the other metals, the resources are limited. In this regard, a diversity of research is progressing to reduce production costs.

Research has been conducted regarding a technique to improve the coercivity and thermostability of a rare earth sintered magnet by micronizing its crystal grains.

The technology is to improve the coercivity and thermostability of a powder by using the hydrogenation-disproportionation-desorption-recombination (HDDR) process. The improvement of the coercivity and thermostability is achievable by micronizing the crystal grains by a gas reaction at a high temperature.

The research to manufacture a bulk magnet by sintering the HDDR processed powder has been globally performed since, if the crystal grains of the HDDR processed powder is very fine to achieve the bulk magnet by inhibiting the grain growth, high coercivity can be obtained without adding an expensive heavy rare earth element such as Dy.

For example, a method of manufacturing a bulk magnet by using a powder prepared through the HDDR process is disclosed in "Journal of Magnetism and Magnetic Materials 323 (2011) 115-121".

However, in the aforementioned method, if a very high heating speed is required, expensive equipment is required. Further, coercivity sharply lowers prior to full densification.

Further, "Scripta Materialia 63 (2010) 1124-1127" discloses a technique of coating a grain boundary by mixing the HDDR processed powder and an Nd—Cu alloy and treating the mixture by heating.

However, in this case, since it is necessary to manufacture a low melting alloy by a rapid cooling method, to again pulverize the alloy to prepare the powder, the costs of the processes increase.

Further, "Applied Physics Letters 103,022404 (2013)" discloses a technique of preparing a nano-sized powder by pulverizing the HDDR processed powder.

However, in this case, since the size of the powder is too fine, it is vulnerable to oxidation. To sinter the powder, since a special post process is required, there are many issues to actually apply this technique.

When the crystal grains of a rare earth alloy are micronized to improve the magnetic properties according to temperature and when raw material powder is micronized to improve the coercivity at a room temperature, the average grain size needs to be reduced during jet-milling. To reduce the average grain size, jet-milling needs to be performed for a long time. If the time of performing the jet-milling is increased, the number of ultra-fine grains increases. The increase of the ultra-fine raw material powder results in low efficiency in an alignment in a magnetic field.

PRIOR ART DOCUMENT

Patent Document

[Patent Document 1] Korean Registered Patent No. 10-1632562 (Registered on Jun. 16, 2016)

DISCLOSURE

Technical Problem

Therefore, it is an object of the present invention to solve the above problems and to provide a method for manufacturing a rare earth sintered magnet, and more particularly, to a method for manufacturing a rare earth sintered magnet by many times repetitively finely pulverizing a rare earth alloy on a jet mill by supplying high-pressure nitrogen gas to prevent the powder from becoming ultra-fine and to narrow the grain size distribution so that an alignment in a magnetic field is easily performed, and by micronizing crystal grains by using a hydrogenation-disproportionation-desorption-recombination (HDDR) process, to improve the coercivity and thermostability of the rare earth sintered magnet.

Technical Solution

In accordance with an embodiment of the present invention to achieve the above object, there is provided a method for manufacturing a rare earth sintered magnet comprising the steps of:

- preparing a rare earth alloy composed of xwt % RE-ywt % B-zwt % TM-bal.wt % Fe (wherein RE is a rare earth element, TM is a 3d transition element, x=28~35, y=0.5~1.5 and z=0~15);
- coarsely pulverizing the prepared rare earth alloy;
- finely pulverizing a powder of rare earth alloy which has been coarsely pulverized, repetitively 2~10 times, using a jet mill method;
- aligning and compacting the finely pulverized rare earth alloy powder in a magnetic field, to be magnetized;
- performing a HDDR process to a compact which has been magnetized;
- sintering the HDDR processed compact; and
- loading the sintered alloy into a heating furnace to be heat-treated under a vacuum or in an inert gas atmosphere.

In the finely pulverizing step, a rotational speed for classification is 2,000~8,000 rpm.

In the finely pulverizing step, nitrogen gas of 6~10 atm is ejected so that the powder particles collide with one another to be pulverized. The finely pulverizing step is performed 2~10 times. The rotational speed in a classifying section during each pulverizing process is 2,000~8,000 rpm and an atmospheric pressure of supplying nitrogen gas is 6~10 atm.

The rotational speed in the classifying section during a primary pulverizing step, is 2,000~8,000 rpm and an average particle size of the rare earth powder at an outlet in the classifying section is 3~15 μm.

The primary pulverizing step is repeated 2~9 times. The rotational speed in the classifying section during the final pulverizing process after the primary pulverizing process is 8,000 rpm and the average particle size of the rare earth powder at the outlet in the classifying section is 1~4 μm.

After the compact obtained by compacting in a magnetic field is loaded in the heating furnace and is heated under a vacuum atmosphere from room temperature to 400° C., the compact is maintained for 0.5~3 hours to completely remove the remaining impure organic matters.

In the HDDR process performing step, the magnetized compact is loaded into a vacuum furnace to remove the impure organic matters and then to be vacuum-exhausted, subsequently the compact is heated at 700~900° C. and is maintained for 1~3 hours by changing the vacuum furnace atmosphere to a hydrogen atmosphere of 0.2~0.5 atm and then is heated at the same temperature for 10 minutes to 1 hour by changing the hydrogen atmosphere of 0.2~0.5 atm to a vacuum atmosphere.

The compact is sintered at 900~1,200° C., preferably 1,000~1,100° C., for 4~8 hours under a vacuum or in an argon atmosphere.

After the sintering step, the sintered compact is rapidly cooled by changing the vacuum furnace atmosphere to an argon atmosphere.

After the cooling step, the sintered compact is heat-treated at 400~550° C. for 1~3 hours and rapidly cooled by changing the vacuum furnace atmosphere to an argon atmosphere. A final heat treatment is performed at 0~550° C. for 1.5~2.5 hours.

Advantageous Effects

In accordance with the method for manufacturing a rare earth sintered magnet of the present invention as described above, since a rare earth alloy is many times repetitively finely pulverized on a jet mill by supplying high-pressure nitrogen gas to narrow grain size distribution to enable easy alignment in a magnetic field and since crystal grains of a rare earth alloy powder is micronized by a hydrogenation-disproportionation-desorption-recombination (HDDR) process, the magnetic properties of the rare earth sintered magnet according to a temperature are improved and the coercivity thereof at a room temperature is also improved.

Further, since the rare earth alloy is many times repetitively finely pulverized by using a jet mill method by supplying high-pressure nitrogen gas, the occurrence of ultra-fine crystal grains of the rare earth alloy powder is minimized to improve the alignment of the powder in a magnetic field during the compacting process in a magnetic field. After the powder with a generally used grain size (about 3.5 μm) is compacted in a magnetic field, since the HDDR process is performed before the sintering process, the crystal grain size of the powder is reduced, thereby preparing the compact with micronized crystal grains through the proper sintering process.

DESCRIPTION OF DRAWINGS

The above and other features and advantages of the present invention will become more apparent by describing in detail exemplary embodiments thereof with reference to the attached drawing(s) in which:

FIG. 1 is a flow chart illustrating a process of a method for manufacturing a rare earth sintered magnet according to the present invention.

MODE FOR INVENTION

The present invention will now be described more fully hereinafter with reference to the accompanying drawing(s), in which preferred embodiments of the invention are shown.

Manufacturing Method (1) Step of Preparing a Rare Earth Alloy Powder

A raw material powder is prepared as a powder formed of a rare earth alloy. When the rare earth alloy(s) is composed of at least one selected from the rare earth elements (RE=Nd, Pr, La, Ce, Ho, Dy and Tb), Fe, at least one selected from the 3d transition elements (TM=Co, Cu, Al, Ga, Nb, Ti, Mo, V, Zr and Zn) and/or B, an RE-Fe alloy, an RE-Fe-TM alloy, an RE-Fe—B alloy and an RE-Fe-TM-B alloy are obtained. More specifically, the rare earth alloys are an Nd—Fe—B alloy, an Nd—Fe—Co alloy, an Nd—Fe—Co—B alloy, etc. The powders composed of the rare earth alloys, which are publicly known to be used for a rare earth sintered magnet, can be used as the raw material powders.

The raw material powder is the alloy composed of xwt % RE-ywt % B-zwt % TM-bal.wt % Fe (RE is a rare earth element, TM is a 3d transition element, x=28~35, y=0.5~1.5 and z=0~15).

The raw material powder formed of the alloy having a desired composition is manufactured by pulverizing a foil, which is obtained by melting and casting an ingot or a rapid cooling-based solidification method, by a pulverizing device such as a jet mill, attribution mill, ball mill, Attritor grinding mill, ball mill, vibration mill, etc. or by an atomizing method such a gas atomizing method. The powder which is obtained by the publicly known method for manufacturing a powder or the powder which is manufactured by the atomizing method may be further pulverized for use. The particle-size distribution of the raw material powder or the shape of each particle forming the powder is adjustable by properly changing the pulverizing conditions and manufacturing conditions. Although the shape of the particle does not particularly matter, the closer it is to a sphere, the easier it is to get densification, and it is easy for the particle to rotate by application of a magnetic field. In the case of using the atomizing method, the powder with a high sphericalness can be obtained.

In the process of coarsely pulverizing the manufactured alloy strip, the strip is loaded into a vacuum furnace to be vacuum-exhausted and then maintained for 2 hours or more in a hydrogen atmosphere at room temperature so that hydrogen is absorbed into the strip. Subsequently, the strip is heated at 600° C. under a vacuum, to remove the hydrogen which is present in the strip. The particle size of the coarsely pulverized powder is 500~1,000 μm.

(2) Step of Finely Pulverizing the Rare Earth Alloy Powder

Generally, if the target average particle size is too small when the rare earth powder is pulverized on a crushing section of the jet mill, the powder stays for a long time in the crushing section of the jet mill and therefore the raw material powder becomes ultra-fine.

When the raw material powder is ultra-fine, the degree of alignment of the powder in a magnetic field is reduced during the compacting process in a magnetic field.

In the present invention, the jet milling process is performed many times, 2 or more times, to prevent the powder from being ultra-fine. The ultra-fine powder is minimized by repeating the pulverizing process 2 or more times, instead of minimizing the crushing time of the jet mill. Even though a small quantity of the ultra-fine powder results during the pulverizing process for a short time, the ultra-fine powder resulting from the pulverizing process is removed through the rotational speed of a cyclone in a proper classifying section during each pulverizing process whenever the jet milling is performed.

In the step of finely pulverizing the powder, the hydrogenated and coarsely pulverized powder, is pulverized using the jet mill technique. Nitrogen gas is supplied at high pressure to cause the collision among the powder particles to be more effectively pulverized. A uniform and fine powder with an average grain size of 1~5.0 μM is prepared by the pulverizing method supplying the high-pressure nitrogen gas.

The coarsely pulverized powder is fed to the crushing section of the jet mill and nitrogen gas of 6~10 atm is ejected to the crashing section, so that the powder particles collide with one another to be pulverized.

The pulverized powder in an axial flow by an air current generating in a dust collecting section (not shown) is fed to the classifying section of the crushing section. A rotor for crushing and classifying the powder particles rotates in the classifying section, so that the powder in the classifying section is led to the outside of the classifying boundary layer by centrifugal force and a layer separation for classifying the powder particles is formed in the centrifugal force field. The pulverized powder is classified as coarse particles and fine particles under the influence of airflow and rotational speed. The centrifugal force and the drag force acting on the particles are generated in the direction of rotation radius in the classifying section. The centrifugal force is generated by the rotatory power in the classifying section, and the drag is generated when the particles are exposed to the airflow generated by the rotation in the classifying section.

The particles influenced by the centrifugal force are deflected to the coarse powder, and the pulverizing and classifying processes are repeated until the particles are classified through the recirculation pipe. The particles influenced by the drag force are deflected to the fine powder, to be moved through an outlet (not shown) to be collected.

The pulverizing process is performed 2~10 times. The rotational speed in the classifying section during each pulverizing process is 2,000~8,000 rpm and the supply pressure of nitrogen gas is 6~10 atm.

The rotational speed in the classifying section during the primary pulverizing process is 2,000~8,000 rpm and an average grain size of the rare earth powder discharged from the outlet in the classifying section is 3~15 μm.

The primary pulverizing process is performed 2~9 times. After the primary pulverizing process, the rotational speed in the classifying section during the final pulverizing process is 8,000 rpm and an average grain size of the rare earth powder discharged from the outlet in the classifying section is 1~4 μm.

The maximum particle size of the raw material powder pulverized using the jet mill is 5.0 μM or less, preferably 1~4 μm.

(3) Step of Aligning and Compacting the Finely Pulverized Rare Earth Alloy Powder in a Magnetic Field A lubricant may be added to the raw material powder. In the case of using a mixture including a lubricant, since it becomes easy for each particle forming the raw material powder to rotate upon applying a magnetic field, it is easy to improve the alignment. Lubricants which have different material qualities and forms (liquid state, solid state) that do not substantially react with the raw material powder may be used. For example, liquid lubricants include ethanol, machine oil, silicone oil, castor oil, etc. and solid lubricants include metallic salts, such as zinc stearate, etc., hexagonal boron nitride, wax, etc. The amount of a liquid lubricant added is about 0.01~10% by mass for the raw material powder of 100 g and the amount of the solid lubricant added is about 0.01~5% by mass for the mass of the raw material powder.

A mold in a desired shape and size is prepared to obtain a compact in the desired shape and size. A mold, which is used to manufacture the powder compact used as a material of the conventional sintered magnet and typically comprises a die, an upper punch and a lower punch, may be used. Otherwise, a cold isostatic press can be used.

When a mold is filled with the raw material powder at a packing density of 2.0~2.2 g/cc, the powder is completely aligned in a high magnetic field, which is generated by applying pulsed current to electromagnets positioned at the right and left of the mold, in a nitrogen atmosphere. Subsequently, compacting is performed simultaneously while maintaining the orientation of the powder which has been already completely aligned by a DC magnetic field generated by applying direct current, a static magnetic field of 2.0 Tesla, to manufacture the compact.

(4) Step of Performing the HDDR Process

In the HDDR process performing step, the magnetized compact is loaded into a vacuum furnace to remove the impure organic matters and then to be vacuum-exhausted, subsequently the compact is heated at 700~900° C. and is maintained for 1~3 hours by changing the vacuum furnace atmosphere to the hydrogen atmosphere of 0.2~0.5 atm, to cause a layer separation from $Nd_2Fe_{14}B$, which is the main phase of the magnet, to $NdH_x$+α–Fe+$Fe_2B$. Then, the compact is heated at the same temperature for 10 minutes to 1 hour by changing the hydrogen atmosphere of 0.2~0.5 atm to the vacuum atmosphere, such that $NdH_x$+α–Fe+$Fe_2B$ is recombined to be $Nd_2Fe_{14}B$, to form the powder with a fine crystal grain of 200~300 nm in size.

(5) Step of Sintering

The compact is sintered under the sintering conditions of a temperature of 900~1,200° C., for 4~8 hours, under a vacuum or in an argon atmosphere, etc. Preferably, the temperature range is 1,000~1,100° C.

(6) Step of Heat-Treating

After the sintering step, the vacuum furnace atmosphere is changed to an argon atmosphere to rapidly cool the sintered compact.

After the cooling process, the compact is heat-treated at 400~550° C. under a vacuum atmosphere for 1~3 hours and rapidly cooled by changing the vacuum furnace atmosphere to an argon atmosphere.

The present invention will be more specifically described with reference to the examples below:

EXAMPLE 1

In this Example, an alloy composed of 32wt % Nd-1 wt % B-2wt % TM-bal.wt % Fe (wherein TM is a 3d transition element) was melted, in an argon atmosphere, by an induction heating method and subsequently was rapidly cooled by a strip casting method, to prepare an alloy strip.

In the process of coarsely pulverizing the prepared alloy strip, the alloy strip was loaded into a vacuum furnace to be vacuum-exhausted and then maintained in a hydrogen atmosphere for 2 hours or more, to allow hydrogen to be absorbed into the alloy strip. Subsequently, the alloy strip was heated at 600° C. under a vacuum, to remove hydrogen present in the alloy strip. The powder is pulverized to the particles of 500~1000 μm in size.

The hydrogenated and coarsely pulverized powder was prepared as a uniform and fine powder by the pulverizing method using the jet mill technique. The process of preparing the alloy strip as the fine powder was performed in a nitrogen or inert gas atmosphere, to prevent the deterioration of magnetic properties by contamination of oxygen.

The coarsely pulverized alloy powder was fed to the crushing section of the jet mill by ejecting nitrogen gas of 7 atm such that the powder particles collide one another to be pulverized.

The pulverized powder taking passage in the axial flow by the airflow generated in the dust collecting section (not shown) was fed to the classifying section of the crushing section.

The rotational speed in the classifying section during the fine pulverizing process was fixed to 8,000 rpm and the average particle size of the primarily finely pulverized powder was about 3.5 μm.

The process of comparing the fine rare earth powder finely pulverized by the jet mill is performed in a magnetic field. The mold was filled with the rare earth powder a packing density of 2.0~2.2 g/cc. A static magnetic field of 2.0 Tesla was applied to the electromagnets positioned at the right and left of the mold, to align the rare earth powder unidirectionally. Simultaneously, the pressure of upper and lower punches was applied to make a compact.

The compact obtained by the compacting process in a magnetic field was loaded in a vacuum heating furnace and maintained under a vacuum atmosphere and 400° C. or below, to completely remove the remaining impure organic matters, and subsequently heated at 800° C. and maintained for 2 hours by changing the vacuum furnace atmosphere to a hydrogen atmosphere of 0.3 atm, to form a layer separation from, $Nd_2Fe_{14}B$, the main phase of the magnet, to $NdH_x$+α–Fe+$Fe_2B$. Subsequently, the compact was heated at the same temperature for 30 minutes by changing the hydrogen atmosphere of 0.3 atm to a vacuum atmosphere, such that $NdH_x$+α–Fe+$Fe_2B$ was recombined as $Nd_2Fe_{14}B$, to form fine crystal grains which were each 200~300 nm in size in the powder.

The compact was sintered and densified under the sintering conditions of a temperature of 1,020~1,050° C., for 4~8 hours, under a vacuum or in an argon atmosphere, etc.

After the sintering and densifying process, the sintered compact was rapidly cooled by changing the vacuum furnace atmosphere to an argon atmosphere.

After the cooling process, the compact was heat-treated at 470° C. under a vacuum atmosphere for 2 hours. After the heat-treatment was finished and rapidly cooled by changing the atmosphere of the vacuum furnace to an argon atmosphere.

In the comparative example of Table 1, the jet milling process was performed only once and the speed of a classifier was fixed as 8,000 rpm for classification. The average particle size in the prepared powder for use was 3.5 μm. No HDDR process was performed in the comparative example.

In the exemplary embodiment, the jet milling process was performed only once and the speed of a classifier was fixed as 8,000 rpm for classification. The average particle size in the prepared powder for use was 3.5 μm. The HDDR process was performed in the exemplary embodiment.

In Table 1, the magnetic properties in the comparative example and the exemplary embodiment were obtained by the respective loops by applying the maximum magnetic field of 30 kOe using the B—H loop tracer. The results are stated in Table 1.

TABLE 1

| | Processes from compacting to sintering | | | Magnetic properties | | |
|---|---|---|---|---|---|---|
| Sample | Compacting condition | Whether to perform HDDR process | Sintering condition | Residual magnetic flux density (kG) | Coercivity, (kOe) | Maximum magnetic energy (MGOe) |
| Comparative example | Applied magnetic field: 2 Tesla | N | 1,050° C. *4 hous | 13.5 | 15.1 | 44.5 |

TABLE 1-continued

| | Processes from compacting to sintering | | | Magnetic properties | | |
|---|---|---|---|---|---|---|
| Sample | Compacting condition | Whether to perform HDDR process | Sintering condition | Residual magnetic flux density (kG) | Coercivity, (kOe) | Maximum magnetic energy (MGOe) |
| Exemplary embodiment | Applied magnetic field: 2 Tesla | Y | 1,020° C. *8 hous | 13.4 | 18.5 | 44.0 |

In Table 1, it is noticed that the comparative example without the HDDR process and the exemplary embodiment with the HDDR process are relatively highly different in respect to the coercivity. The reason to obtain the above results is that the crystal grains were micronized to improve the magnetic properties of the rare earth sintered magnet according to a temperature and to improve the coercivity at a room temperature.

While the present invention has been particularly shown and described with reference to examples thereof, it will be understood by those of ordinary skill in the art that various modifications and alternative arrangements in form and details may be made therein without departing from the spirit and scope of the present invention as defined by the following claims. The scope of the claims, therefore, should be accorded the broadest interpretation so as to encompass all such modifications and similar arrangements. For example, the compositions of the raw material powders, the shape or size of the compact, the rate of applying a magnetic field, the sintering conditions, etc. may be properly modified.

The invention claimed is:

1. A method for manufacturing a rare earth sintered magnet, the method comprising the steps of:

preparing a rare earth alloy comprising xwt % RE-ywt % B-zwt % TM-bal.wt % Fe wherein RE is a rare earth element, TM is a 3d transition element, x=28~35, y=0.5~1.5 and z=0~15;

coarsely pulverizing the prepared rare earth alloy;

finely pulverizing a powder of the pulverized rare earth alloy which has been coarsely pulverized, repetitively 2~10 times, using a jet mill method;

aligning and compacting the finely pulverized rare earth alloy powder in a magnetic field, to be magnetized;

performing a hydrogenation-disproportionation-desorption-recombination (HDDR) process to a compact which has been magnetized;

sintering the HDDR processed compact; and loading a sintered alloy into a heating furnace to be heat-treated under a vacuum or in an inert gas atmosphere, thereby forming the rare earth sintered magnet, wherein the finely pulverizing step comprises a first pulverizing process and a second pulverizing process, wherein, in the finely pulverizing step, classification of the finely pulverized powder of rare earth is carried out at a rotational speed of 2,000~8,000 rpm in each classifying section and nitrogen gas is supplied to the classifying section at an atmospheric pressure 6~10 atm, wherein, in the first pulverizing process, classification is carried out at a rotational speed of 2,000~8,000 rpm, such that an average particle size of the rare earth powder discharged at an outlet in the classifying section is 3~15 μm, wherein, after repeating the first pulverizing process 2 to 4 times, classification is carried out at a rotational speed of 8,000 rpm, such that the average particle size of the rare earth powder discharged at the outlet in the classifying section is 1~4 μm, wherein, in the finely pulverizing step, an ultra-fine powder resulting from the pulverizing process is removed through the rotational speed in the classifying section during each pulverizing process whenever jet milling is performed, and wherein, in the HDDR process performing step, the magnetized compact is loaded into a vacuum furnace for vacuum-exhaust to be heated at 700~900° C. and maintained for 1~3 hours by changing the vacuum furnace atmosphere to a hydrogen atmosphere of 0.2~0.5 atm, and subsequently to be heated at the same temperature for 10 minutes to 1 hour by changing the hydrogen atmosphere of 0.2~0.5 atm to a vacuum atmosphere.

* * * * *